(12) United States Patent
Shirata et al.

(10) Patent No.: US 10,734,144 B2
(45) Date of Patent: Aug. 4, 2020

(54) PRODUCTION METHOD FOR METAL OXIDE PARTICLES, METAL OXIDE POWDER, AND MAGNETIC RECORDING MEDIUM

(71) Applicant: FUJIFILM Corporation, Minato-ku, Tokyo (JP)

(72) Inventors: Masashi Shirata, Minami-ashigara (JP); Yoichi Hosoya, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 357 days.

(21) Appl. No.: 15/627,636

(22) Filed: Jun. 20, 2017

(65) Prior Publication Data
US 2017/0287603 A1 Oct. 5, 2017

Related U.S. Application Data

(60) Division of application No. 15/073,730, filed on Mar. 18, 2016, now abandoned, which is a continuation of application No. PCT/JP2014/075843, filed on Sep. 29, 2014.

(30) Foreign Application Priority Data

Sep. 30, 2013 (JP) ................................. 2013-204839

(51) Int. Cl.
| | | |
|---|---|---|
| H01F 1/00 | (2006.01) | |
| H01F 1/113 | (2006.01) | |
| G11B 5/706 | (2006.01) | |
| G11B 5/714 | (2006.01) | |
| H01F 1/11 | (2006.01) | |
| C01G 49/00 | (2006.01) | |
| C01B 13/36 | (2006.01) | |

(52) U.S. Cl.
CPC ............ *H01F 1/113* (2013.01); *C01B 13/366* (2013.01); *C01G 49/0036* (2013.01); *G11B 5/70678* (2013.01); *G11B 5/714* (2013.01); *H01F 1/11* (2013.01); *C01P 2004/22* (2013.01); *C01P 2004/54* (2013.01); *C01P 2004/64* (2013.01); *C01P 2006/12* (2013.01); *C01P 2006/42* (2013.01)

(58) Field of Classification Search
CPC ....... H01F 1/11; G11B 5/70678; G11B 5/714; C01G 49/0036; C01B 13/366
See application file for complete search history.

(56) References Cited

U.S. PATENT DOCUMENTS

| | | | | |
|---|---|---|---|---|
| 2,620,261 A | 2/1952 | Toxby | | |
| 4,789,494 A | 12/1988 | Aoki et al. | | |
| 5,433,878 A * | 7/1995 | Arai | ................. | B01J 3/008 |
| | | | | 252/62.63 |
| 5,480,630 A * | 1/1996 | Arai | ................. | B82Y 30/00 |
| | | | | 423/625 |
| 6,416,682 B1 * | 7/2002 | Krijgsman | .............. | C04B 35/00 |
| | | | | 252/62.56 |
| 7,803,347 B2 * | 9/2010 | Ajiri | .................. | B01J 3/006 |
| | | | | 423/263 |
| 9,454,983 B2 * | 9/2016 | Hosoya | .............. | C01G 49/0036 |
| 9,502,066 B2 * | 11/2016 | Hosoya | .............. | G11B 5/70678 |
| 9,957,167 B2 * | 5/2018 | Shirata | .............. | C01G 49/0036 |
| 10,102,874 B2 * | 10/2018 | Shirata | .............. | G11B 5/70678 |
| 2007/0042526 A1 * | 2/2007 | Myeong | ................. | A61K 8/044 |
| | | | | 438/104 |
| 2012/0196156 A1 | 8/2012 | Suzuki | | |

FOREIGN PATENT DOCUMENTS

| | | | |
|---|---|---|---|
| EP | 2168919 | * | 3/2010 |
| JP | 61-040823 A | | 2/1986 |
| JP | 61-219721 A | | 9/1986 |
| JP | 62-059531 A | | 3/1987 |
| JP | 2007-269601 A | | 10/2007 |
| JP | 2008-162864 A | | 7/2008 |
| JP | 2009-208969 A | | 9/2009 |
| JP | 2011-45859 A | | 3/2011 |
| JP | 2012-153588 A | | 8/2012 |
| JP | 2013-34952 A | | 2/2013 |
| JP | 2013-60358 A | | 4/2013 |

OTHER PUBLICATIONS

Office Action dated May 17, 2017, from the State Intellectual Property Office of the P.R.C., in counterpart Chinese Application No. 201480053928.4.
Office Action dated Aug. 15, 2017 issued by the Japanese Patent Office in counterpart Japanese Application No. 2015-539416.
Adschiri, "Supercritical Hydrothermal Synthesis of Organic-Inorganic Hybrid Nanoparticles", Chemistry Letters, 2007, vol. 36, No. 10, pp. 1188-1193 (6 pages total).
Adschiri et al., "Supercritical Hydrothermal Synthesis of Nanoparticles for Hybrid Materials—Super Hybrid Materials through Organic Surface Modification—", The Review of high pressure science and technology, 2012, vol. 22, No. 2, pp. 89-96 (8 pages total).
Sue et al., Journal of the Society of Inorganic Materials, Japan, 2005, vol. 12, pp. 429-434 (6 pages total).
Office Action dated Feb. 17, 2017 from the Korean Intellectual Property Office in counterpart Korean Application No. 10-2016-7007479.
Office Action dated Jan. 31, 2017 from the Japanese Patent Office in counterpart Japanese Application No. 2015-539416.

(Continued)

*Primary Examiner* — Steven J Bos
(74) *Attorney, Agent, or Firm* — Sughrue Mion, PLLC

(57) ABSTRACT

A production method for metal oxide particles includes: obtaining precursor particles of a metal oxide by performing a synthesis reaction of the precursor particles in the presence of an organic compound; and converting the obtained precursor particles into metal oxide particles by heating an aqueous solution containing the precursor particles to 300° C. or higher and pressurizing the aqueous solution at a pressure of 20 MPa or higher.

10 Claims, 2 Drawing Sheets

(56) References Cited

OTHER PUBLICATIONS

Office Action dated Oct. 11, 2016, from the Japanese Patent Office in counterpart Japanese Application No. 2015-539416.
Office Action dated Sep. 28, 2016, from the State Intellectual Property Office of the P.R.C., in counterpart Chinese Application No. 201480053928.4.
International Preliminary Report on Patentability dated Apr. 14, 2016 from the International Bureau issued in counterpart Application No. PCT/JP2014/075843.
International Search Report for PCT/JP2014/075843 dated Jan. 6, 2015.
Written Opinion for PCT/JP2014/075843 dated Jan. 6, 2015.
Office Action dated Nov. 7, 2017 from the State Intellectual Property Office of the P.R.C. in counterpart Chinese Application No. 201480053928.4.

* cited by examiner

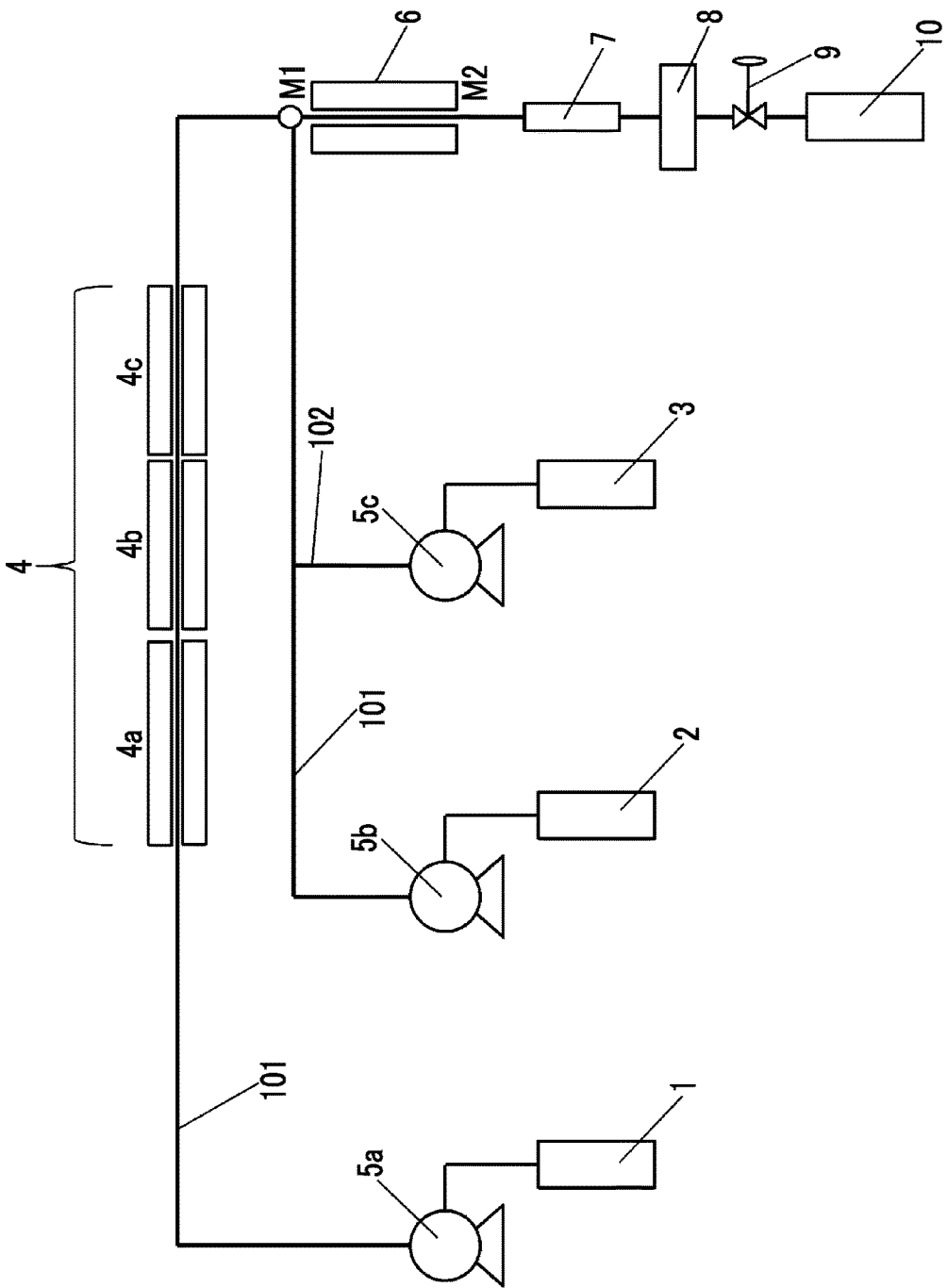

PRODUCTION METHOD FOR METAL OXIDE PARTICLES, METAL OXIDE POWDER, AND MAGNETIC RECORDING MEDIUM

CROSS-REFERENCE TO RELATED APPLICATIONS

This application is a Divisional Application of U.S. application Ser. No. 15/073,730 filed Mar. 18, 2016, which is a Continuation of PCT International Application No. PCT/JP2014/075843 filed on Sep. 29, 2014, which claims priority under 35 U.S.C § 119(a) to Japanese Patent Application No. 2013-204839 filed on Sep. 30, 2013. The above applications are hereby expressly incorporated by reference, in their entirety.

BACKGROUND OF THE INVENTION

1. Field of the Invention

The present invention relates to a production method for metal oxide particles.

Further, the present invention relates to a metal oxide powder containing metal oxide particles that is obtained using the production method, and a magnetic recording medium that contains the powder in a magnetic layer.

2. Description of the Related Art

Fine metal oxide particles are a material which is useful in various fields including a magnetic recording field. As a method of synthesizing such metal oxide particles, recently, a hydrothermal synthesis process has been proposed and attracted attention (for example, JP2013-60358A, JP2009-208969A, and JP2013-34952A).

For example, in the magnetic recording field, in order to improve the filling degree of a magnetic layer and to reduce noise, it is necessary to use a fine-particle magnetic body as a ferromagnetic powder contained in the magnetic layer. In addition, fine metal oxide particles are useful in various fields without being limited to the magnetic recording field. On the other hand, the above-described hydrothermal synthesis process is a method in which metal oxide particles can be produced with high productivity. However, in order to reduce the particle size of the metal oxide particles obtained using the method, further improvement is required.

In addition, in the magnetic recording field, even when the average particle size of a magnetic body is reduced, in a case where a particle size distribution is wide, for example, components on a fine particle side of the particle size distribution may be affected by thermal fluctuation. In this case, recorded magnetic energy cannot overcome thermal energy, and recording may be lost. In addition, components on a coarse particle size of the particle size distribution may increase noise. Therefore, not only a small particle size but also a uniform particle size and a sharp particle size distribution are required for metal oxide particles which are used in the magnetic recording field. Fine metal oxide particles having high uniformity in particle size are useful in various fields without being limited to the magnetic recording field.

Therefore, an object of the present invention is to produce fine metal oxide particles having high uniformity in particle size using a hydrothermal synthesis process.

SUMMARY OF THE INVENTION

In the above-described hydrothermal synthesis process, precursor particles of a metal oxide are heated and pressurized and are kept in the presence of water having high reactivity such that a conversion reaction of converting the precursor particles into metal oxide particles is performed to obtain metal oxide particles. As a result of thorough investigation on the hydrothermal synthesis process, the present inventors newly found that fine metal oxide particles can be obtained by performing a synthesis reaction of the precursor particles, which are provided for the hydrothermal synthesis process, in the presence of an organic compound. It is presumed that, when the precursor particles to which the organic compound is attached are provided for the conversion reaction into metal oxide particles, the precursor particles are crystallized after being temporarily melted in a high-temperature and high-pressure system for a moment; as a result, metal oxide particles precipitate (the precursor particles are converted into metal oxide particles). The present inventors presumed that, during a period from melting to crystallization, the presence of the organic compound near the particles contributes to a reduction in the particle size of crystallized metal oxide particles and uniformity improvement in the particle size. In addition, by being synthesized in the presence of the organic compound, fine precursor particles having high uniformity in particle size can be obtained while preventing aggregation thereof. It is presumed that the above-described fact also contributes to a reduction in the particle size of metal oxide particles, which are converted from the precursor particles, and uniformity improvement in the particle sizes. JP2013-60358A, JP2009-208969A, and JP2013-34952A describe that, in the hydrothermal synthesis process, a conversion reaction of converting precursor particles into metal oxide particles is performed in the presence of an organic modifier. However, JP2013-60358A, JP2009-208969A, and JP2013-34952A do not describe that a synthesis reaction of precursor particles, which is the previous step of the hydrothermal synthesis process, is performed in the presence of an organic compound as stated in the new finding of the present inventors.

The present invention has been completed based on the above findings.

According to an aspect of the present invention, there is provided a production method for metal oxide particles including:

obtaining precursor particles of a metal oxide by performing a synthesis reaction of the precursor particles in the presence of an organic compound; and converting the obtained precursor particles into metal oxide particles by heating an aqueous solution containing the precursor particles to 300° C. or higher and pressurizing the aqueous solution at a pressure of 20 MPa or higher.

In the above-described aspect, the heating and pressurization is performed while continuously feeding the aqueous solution.

In the above-described aspect, the synthesis reaction is performed in an aqueous reaction solution in a pH range of 5 to 14.

In the above-described aspect, an average particle size of the precursor particles obtained by the synthesis reaction is 25 nm or less.

In the above-described aspect, a coefficient of variation in the particle size of the precursor particles obtained by the synthesis reaction is 5% to 40%.

In the above-described aspect, in the synthesis reaction, an iron salt, an alkali earth metal salt, and the organic compound are mixed with each other in an aqueous solution so as to cause precursor particles of hexagonal ferrite to precipitate.

In the above-described aspect, the conversion of the precursor particles into metal oxide particles is performed through the following steps including: adding a precursor particle solution containing the precursor particles, which are obtained in the synthesis reaction, to a liquid feeding path to which water, which is heated to 300° C. or higher and is pressurized at a pressure of 20 MPa or higher, is continuously fed; and converting the precursor particles into metal oxide particles by continuously feeding a mixed solution containing water and the precursor particle solution to the liquid feeding path while heating the mixed solution to 300° C. or higher and pressurizing the mixed solution at a pressure of 20 MPa or higher.

In the above-described aspect, the metal oxide particles are hexagonal ferrite particles selected from the group consisting of barium ferrite, strontium ferrite, and a mixed crystal of barium ferrite and strontium ferrite.

In the above-described aspect, the organic compound is selected from the group consisting of a carboxylic acid, a carboxylate, an anionic surfactant, and a water-soluble polymer.

According to another aspect of the present invention, there is provided a metal oxide powder containing metal oxide particles which is obtained using the above-described production method.

In the above-described aspect, the metal oxide powder is a ferromagnetic hexagonal ferrite powder.

In the above-described aspect, the metal oxide powder is a magnetic powder for magnetic recording.

In the above-described aspect, an average sphere equivalent diameter of the metal oxide powder is 5 nm to 30 nm.

In the above-described aspect, a coefficient of variation in the sphere equivalent diameter of the metal oxide powder is 5% to 20%.

According to still another aspect of the present invention, there is provided a magnetic recording medium including a magnetic layer that contains a ferromagnetic powder and a binder on a nonmagnetic support, in which the ferromagnetic powder is the above-described metal oxide powder.

According to the present invention, fine metal oxide particles having high uniformity in particle size can be obtained using a hydrothermal synthesis process. By using a metal oxide powder, which is formed of the metal oxide particles obtained as described above, as a ferromagnetic powder of a magnetic layer, a magnetic recording medium having superior electromagnetic conversion characteristics can be provided.

BRIEF DESCRIPTION OF THE DRAWINGS

FIG. 2 is a schematic diagram showing another embodiment of a production device which is preferable for a continuous hydrothermal synthesis process.

DESCRIPTION OF THE PREFERRED EMBODIMENTS

[Production Method for Metal Oxide Particles]

Figure 1:
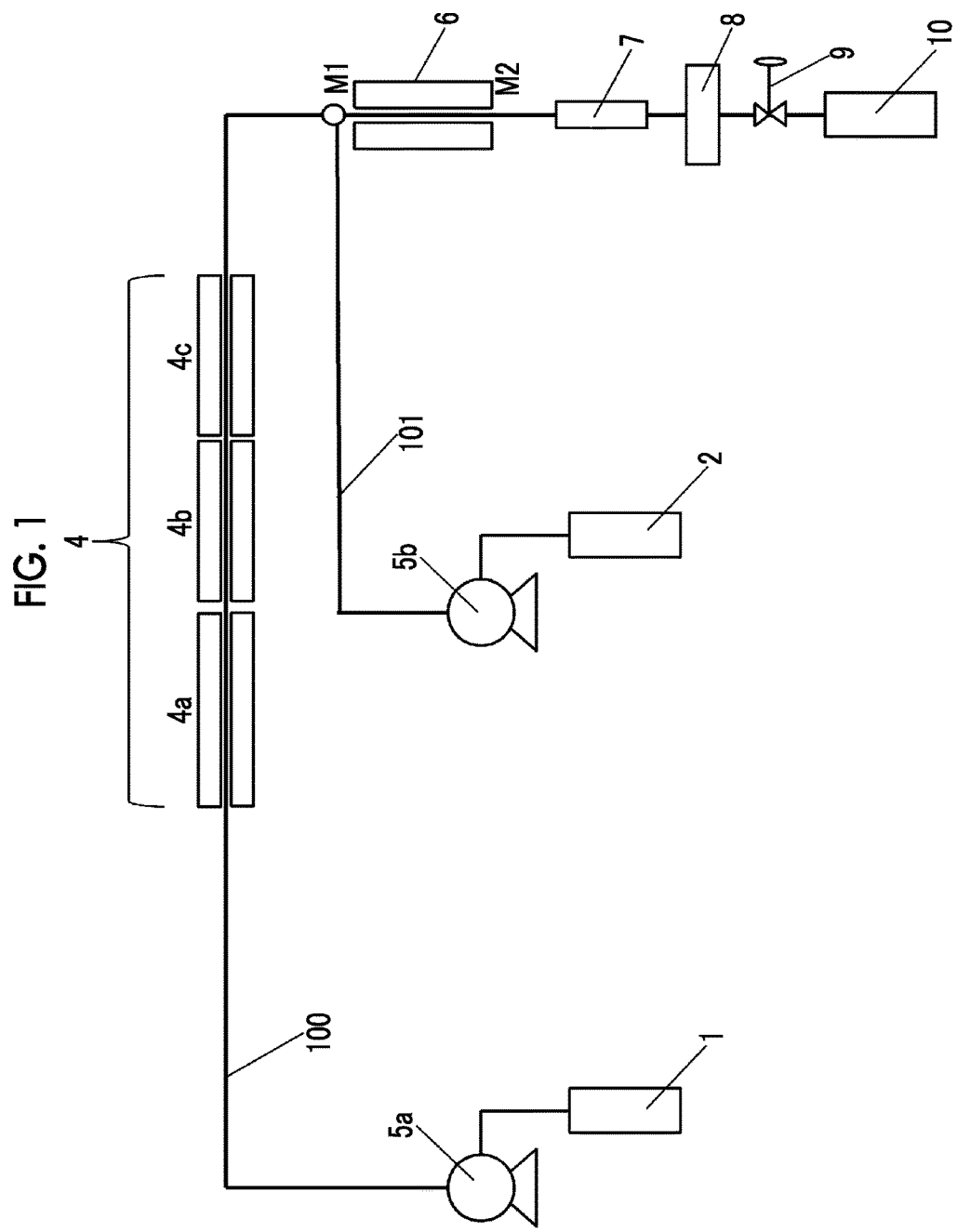
FIG. 1 is a schematic diagram showing an embodiment of a production device which is preferable for a continuous hydrothermal synthesis process.

A production method for metal oxide particles according to an embodiment of the present invention includes:
obtaining precursor particles of a metal oxide by performing a synthesis reaction of the precursor particles in the presence of an organic compound; and
converting the obtained precursor particles into metal oxide particles by heating an aqueous solution containing the precursor particles to 300° C. or higher and pressurizing the aqueous solution at a pressure of 20 MPa or higher.

A reaction system in which water is present is heated to 300° C. or higher and is pressurized at a pressure of 20 MPa or higher. As a result, water is in a subcritical to supercritical state, which brings about a reaction field having extremely high reactivity. By bringing the metal oxide particles of metal oxide particles into contact with water having high reactivity, a reaction of converting the precursor particles into metal oxide particles is rapidly initiated. In the production method for metal oxide particles according to the embodiment of the present invention, the synthesis reaction of the precursor particles provided for the reaction is performed in the presence of an organic compound. As described above, by providing the precursor particles obtained as above for the hydrothermal synthesis process, fine metal oxide particles having high uniformity in particle size can be obtained.

Hereinafter, the above-described production method will be described in more detail.

<Synthesis Reaction of Precursor Particles>

Precursor Particles

The precursor particles are particles of a material which can be converted into a desired metal oxide by being kept in the presence of water in a subcritical to supercritical state. Examples of the metal include Fe, Co, Ni, Cu, Ag, Au, Zn, Cd, Hg, Al, Ga, In, Tl, Si, Ge, Sn, Pb, Ti, Zr, Mn, Eu, Y, Nb, Ce, and Ba. However, the metal is not limited to these examples. The metal can be selected from metals which constitute fine particles, preferably, particles having a nano-order particle size (nanoparticles) and are known to persons skilled in the art.

The precursor of a metal oxide may be, for example, a metal hydroxide but is not limited thereto. Various salts, which can be converted into a metal oxide by being kept in the presence of water in a subcritical to supercritical state, can be used. The precursor particles may exhibit high solubility in water and may be dissolved in an aqueous solvent described below. Alternatively, the precursor particles may exhibit poor solubility in water and may be dispersed (sol state) in an aqueous solvent in the form of colloidal particles.

In the embodiment, the metal oxide particles obtained using the above-described production method are hexagonal ferrite particles. The hexagonal ferrite particles are magnetic particles and are useful for various applications and, in particular, as a magnetic powder for magnetic recording.

A hexagonal ferrite containing no substitution element is a metal oxide represented by $AFe_{12}O_{19}$. Here, A represents an alkali earth metal such as barium, strontium, calcium, or lead. In the hexagonal ferrite, some of the above-described metal elements may be substituted with substitution elements described below.

The above-described hexagonal ferrite particle as precursor particles can be obtained by mixing an iron salt with an alkali earth metal salt in an aqueous solution. In the aqueous solution, typically, salts containing iron and alkali earth metal precipitate in the form of particles, preferably, colloidal particles. Next, the particles precipitating in the aqueous solution are kept in the presence of water in the subcritical state to the supercritical state for ferritization to obtain hexagonal ferrite particles. According to the embodiment of the present invention, an organic compound is present in the aqueous solution. The details of the organic compound will be described below.

As the alkali earth metal salt, for example, an alkali earth metal salt of barium, strontium, calcium, lead, or the like can be used. The kind of the alkali earth metal may be determined according to the desired hexagonal ferrite. For example, in order to obtain barium ferrite, a barium salt is used as the alkali earth metal salt. In order to obtain strontium ferrite, a strontium salt is used. In addition, in order to obtain a mixed crystal of barium ferrite and strontium ferrite, a barium salt and a strontium salt may be used in combination as the alkali earth metal salt. As the salt, a water-soluble salt can be preferably used, and examples thereof include: halides such as a hydroxide, a chloride, a bromide, and an iodide; and nitrates.

As the iron salt, a water-soluble salt of iron can be used, and examples thereof include: halides such as a chloride, a bromide, and an iodide; nitrates; sulfates; carbonates; organic acid salts; and complex salts. A mixing ratio of the iron salt and the alkali earth metal salt may be determined according to the desired ferrite composition. In addition to the iron salt and the alkali earth metal salt, a salt of an arbitrary element, which can constitute hexagonal ferrite with iron and an alkali earth metal, may be added. Examples of the arbitrary element include Nb, Co, Ti, and Zn. The addition amount of the salt of an arbitrary element may be determined according to the desired ferrite composition.

By mixing the above-described salts with each other in an aqueous solution containing an organic compound described below, particles (precursor particles of hexagonal ferrite) containing elements, which are contained in the salts, precipitate. Next, the particles precipitating in the aqueous solution are converted into hexagonal ferrite through ferritization.

Organic Compound

In the production method for metal oxide particles according to the embodiment of the present invention, the synthesis reaction of the precursor particles is performed in the presence of an organic compound. As a result, as described above, fine metal oxide particles can be obtained. Examples of the organic compound include: an organic carboxylic acid, an organic nitrogen compound, an organic sulfur compound, an organic phosphorus compound, and a salt thereof; a surfactant; and various polymers. It is preferable that the polymer has a mass average molecular weight of about 1000 to 100000 and exhibits water solubility. In addition, preferable examples of the polymer include a non-ionic polymer and a hydroxyl group-containing polymer. In addition, as the above-described salt, an alkali metal salt is preferable.

Examples of the organic carboxylic acid include an aliphatic carboxylic acid, an alicyclic carboxylic acid, and an aromatic carboxylic acid. Among these, an aliphatic carboxylic acid is preferable. The aliphatic carboxylic acid may be a saturated aliphatic carboxylic acid or an unsaturated aliphatic carboxylic acid. Among these, an unsaturated carboxylic acid is preferable. Although not particularly limited thereto, the number of carbon atoms in the carboxylic acid is, for example, 2 to 24, preferably 5 to 20, and more preferably 8 to 16. Specific examples of the aliphatic carboxylic acid include oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propionic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, and icosanoic acid. However, the aliphatic carboxylic acid is not limited to the examples.

Examples of the organic nitrogen compound include an organic amine, an organic amide compound, and a nitrogen-containing heterocyclic compound.

The organic amine may be any one of a primary amine, a secondary amine, and a tertiary amine. Among these, a primary amine or a secondary amine is preferable. For example, an aliphatic amine is used, and examples thereof include a primary aliphatic amine and a secondary aliphatic amine. Although not particularly limited thereto, the number of carbon atoms in the amine is, for example, 5 to 24, preferably 8 to 20, and more preferably 12 to 18. Specific examples of the organic amine include: alkylamines such as oleylamine, laurylamine, myristylamine, palmitylamine, stearylamine, octylamine, decylamine, dodecylamine, tetradecylamine, hexadecylamine, octadecylamine, and dioctylamine; aromatic amines such as aniline; hydroxyl group-containing amines such as methyl ethanol amine and diethanolamine; and derivatives thereof.

Examples of the nitrogen-containing heterocyclic compound include a saturated or unsaturated heterocyclic compound having 1 to 4 nitrogen atoms and containing a 3-membered or 7-membered ring. As a heteroatom, for example, a sulfur atom or an oxygen atom may be contained. Specific examples of the nitrogen-containing heterocyclic compound include pyridine, lutidine, collidine, and quinoline.

Examples of the organic sulfur compound include an organic sulfide, an organic sulfoxide, and a sulfur-containing heterocyclic compound. Specific examples of the organic sulfur compound include: a dialkyl sulfide such as dibutyl sulfide; a dialkyl sulfoxide such as dimethyl sulfoxide or dibutyl sulfoxide; and a sulfur-containing heterocyclic compound such as thiophene, thiolane, or thiomorpholine.

Examples of the organic phosphorus compound include a phosphate, a phosphine, a phosphine oxide, a trialkyl phosphine, a phosphite, a phosphonate, a phosphonite, a phosphinate, and a phosphinite. Specific examples of the organic phosphorus compound include a trialkyl phosphine such as tributyl phosphine, trihexyl phosphine, or trioctyl phosphine; and a trialkyl phosphine oxide such as tributyl phosphine oxide, trihexyl phosphine oxide, trioctyl phosphine oxide (TOPO), or tridecyl phosphine oxide, Further, examples of the polymer and the surfactant include: polyethylene glycol, polyoxyethylene (1) lauryl ether phosphate, lauryl ether phosphate, sodium polyphosphate, sodium bis(2-ethylhexyl)sulfosuccinate, sodium dodecylbenzene sulfonate, polyacrylic acid and a salt thereof, polymethacryic acid and a salt thereof, a hydroxyl group-containing polymer such as polyvinyl alcohol, a non-ionic polymer such as polyvinyl pyrrolidone, and hydroxyethyl cellulose. As the surfactant, any one of a cationic surfactant, an anionic surfactant, a non-ionic surfactant, and an amphoteric surfactant can be used. Among these, an anionic surfactant is preferable.

The organic compound is not particularly limited as long as it is present in a reaction solution together with a starting material compound of the precursor particles, and the mixing sequence of the organic compound and the starting material compound of the precursor particles is not particularly limited. From the viewpoint of more efficiently suppressing aggregation of the precursor particles in the synthesis reaction, it is preferable that the starting material compound is added to a reaction solvent after adding the organic compound to the reaction solvent to dissolve or suspend the organic compound therein. In addition, the organic compound may be added to the reaction solvent as it is or in the form of a solution or a suspension.

The amount of the organic compound used is preferably in a range of 0.01 parts by mass to 1000 parts by mass, more preferably in a range of 0.05 parts by mass to 500 parts by mass, and still more preferably in a range of 0.1 parts by mass to 300 parts by mass with respect to 100 parts by mass of the precursor particles. The amount of the precursor particles, which is a reference, is a measured value or a theoretical amount of production calculated from the addition amount of the starting material compound. The same shall be applied to values described below which are calculated with reference to the amount of the precursor particles.

Typically, the above-described synthesis reaction is performed in an aqueous solvent. The aqueous solvent may consists of only water or may be a mixed solvent of water and an organic solvent. It is preferable that the proportion of water in the aqueous solvent is 50 mass % or higher, and it is more preferable that the aqueous solvent consists of only water.

As the organic solvent which can be used in combination with water in the aqueous solvent, a solvent having miscibility with water or hydrophilicity is preferable. From this point of view, a polar solvent is preferably used. Here, the polar solvent refers to a solvent which satisfies at least one of the following conditions: a dielectric constant of 15 or higher; and a solubility parameter of 8 or higher. Preferable examples of the organic solvent include alcohols, ketones, aldehydes, nitriles, lactams, oximes, amides, ureas, amines, sulfides, sulfoxides, phosphates, carboxylic acids, esters which are carboxylic acid derivatives, carbonic acid, carbonates, and ethers.

Regarding the pH of the reaction solution used for the synthesis reaction of the precursor particles, a value thereof at a liquid temperature of 25° C. is, for example, 4 to 14, preferably 5 to 14, more preferably 6 to 13, and still more preferably 6 to 8. By performing the synthesis reaction in an aqueous solution having a pH in the above-described range, finer precursor particles can be made to precipitate. To that end, optionally, an acid or a base can be added to the reaction solution to adjust the pH. Examples of the base used herein include sodium hydroxide, potassium hydroxide, sodium carbonate, and ammonia water. As the acid or the base, an acid or a base which can be used to adjust the pH can be used without any particular limitation. It is preferable that the amount of the acid or the base used is adjusted such that a pH value in the above-described range is obtained. The reaction may be performed at room temperature without temperature control or may be performed while performing heating or cooling.

Through the above-described steps, fine precursor particles having a uniform particle size can be obtained. The present inventors presumed that the above-described configuration contributes to a reduction in the particle size of metal oxide particles which are converted from the precursor particles in a step described below. The average particle size of the precursor particles is preferably 25 nm or less, more preferably 20 nm or less, and still more preferably less than 20 nm. In addition, in order to obtain metal oxide particles having a particle size in a preferable range described below, it is preferable that the average particle size of the precursor particles is 1 nm or more. In addition, regarding the particle size distribution, a coefficient of variation in the particle size of the precursor particles is preferably 5% to 40% and more preferably 5% to 30%. The above-described coefficient of variation may be 10% to 30% or may be 15% to 30%.

Here, the average particle size of the precursor particles and the coefficient of variation in the particle size are values which are measured using a method described below as a method of measuring the average sphere equivalent diameter of a metal oxide powder and the coefficient of variation in the sphere equivalent diameter.

<Conversion into Metal Oxide Particles>

The precursor particles synthesized through the above-described steps may be recovered from the reaction solution after the synthesis reaction using a well-known method. Alternatively, the reaction solution after the synthesis reaction may be provided as it is for the reaction for the conversion into metal oxide particles. The latter method is more preferable because the process is simple. In the production method for metal oxide particles according to the embodiment of the present invention, the precursor particles are converted into metal oxide particles by heating and pressurizing an aqueous solution containing the precursor particles at the above-described temperature and pressure such that water contained in the aqueous solution is in a subcritical to supercritical state. It is more preferable that the heating temperature is in a range of 300° C. to 500° C. and that the pressurization pressure is in a range of 20 MPa to 50 MPa. It is still more preferable that the heating temperature is in a range of 350° C. to 500° C. The heating and pressurization may be performed on the reaction solution in a reaction vessel without feeding the solution (batch hydrothermal synthesis process). However, from the viewpoint of improving productivity, it is preferable that a solution which has been continuously fed is heated and pressurized (continuous hydrothermal synthesis process)

Specific embodiments of the continuous hydrothermal synthesis process are as follows.

(1) The precursor particles are converted into a metal oxide in a reaction flow path by continuously feeding an aqueous solution containing the precursor particles to the reaction flow path in which liquid flowing therethrough is heated to 300° C. or higher and is pressurized at a pressure of 20 MPa or higher.

(2) The precursor particles are converted into a metal oxide using a method including: adding an aqueous solution containing the precursor particles to a liquid feeding path to which water, which is heated to 300° C. or higher and is pressurized at a pressure of 20 MPa or higher, is continuously fed; and continuously feeding a mixed solution containing water and the aqueous solution, which contains the precursor particles of hexagonal ferrite, to the liquid feeding path while heating the mixed solution to 300° C. or higher and pressurizing the mixed solution at a pressure of 20 MPa or higher.

Embodiment (2) in which water in the subcritical state to the supercritical state is brought into contact with the aqueous solution containing the precursor particles is different from Embodiment (1) in which the aqueous solution containing the precursor particles is heated and pressurized so as to be in the subcritical state to the supercritical state. Embodiment (2) is more advantageous in that the conversion can be made to advance early because the precursor particles are instantly in a highly reactive state by coming into contact with water in a subcritical to supercritical state. In order to make the reaction advance favorably, the amount of the precursor particles in the aqueous solution added to the liquid feeding path is preferably about 0.01 parts by mass to 10 parts by mass with respect to 100 parts by mass of the solvent.

In the liquid feeding path, water in the high reactive state is mixed with the aqueous solution containing the precursor particles, and the obtained mixed solution is fed. Further, in the liquid feeding path, the mixed solution is continuously fed while being heated to 300° C. or higher and pressurized at a pressure of 20 MPa or higher. A reaction system in which water is present is heated to 300° C. or higher and is pressurized at a pressure of 20 MPa or higher. As a result, water is in the subcritical and the supercritical state. In the presence of water in the above-described state, the reaction of converting the precursor particles into metal oxide particles further advances. It is more preferable that the heating temperature is in a range of 300° C. to 500° C. and that the pressure applied to the reaction system is in a range of 20 MPa to 50 MPa. It is still more preferable that the heating temperature is in a range of 350° C. to 500° C. In this way, metal oxide particles which are converted from the precursor particles can be obtained.

From the viewpoints of workability and productivity, it is advantageous that the above-described series of steps are performed while continuously feeding the solution to be mixed with water. FIG. 1 is a schematic diagram showing an embodiment of a production device which is preferable for a continuous hydrothermal synthesis process and can perform the above-described steps.

The production device shown in FIG. 1 includes liquid tanks 1 and 2, heating means 4 (4a to 4c), pressurization-liquid feeding means 5a and 5b, a reactor 6, a cooling portion 7, a filtering means 8, a pressure regulating valve 9, and a recovery portion 10, in which liquids are fed from the respective liquid tanks through pipes 100 and 101.

In an embodiment, water such as purified water or distilled water is introduced into the liquid tank 1, and a precursor particle solution is introduced into the liquid tank 2. Water introduced into the liquid tank 1 is fed into the pipe 100 while being pressurized by the pressurization-liquid feeding means 5a and is heated by the heating means 4. As a result, water is in the subcritical state to the supercritical state and reaches a mixing portion M1.

On the other hand, the precursor particle solution which has been fed from the liquid tank 2 to the pipe 101 by the pressurization-liquid feeding means 5b flows and reaches the mixing portion M1. Next, in the mixing portion M1, the precursor particle solution comes into contact with water in a subcritical to supercritical state. As a result, the reaction of converting the precursor particles into metal oxide particles is initiated. Next, in the reactor, the mixed solution is heated and further pressurized by the pressurization means 5a. As a result, water which is present in the reaction system of the reactor 6 is in a subcritical to supercritical state, and the reaction of converting the precursor particles into metal oxide particles further advances. Next, a solution containing the metal oxide particles, which are converted from the precursor particles, is discharged from a discharge port M2. In the cooling portion 7, the discharged solution is mixed with cold water to be cooled, and then the metal oxide particles are collected in the filtering means (for example, a filter) 8. The metal oxide particles collected by the filtering means 8 are discharged from the filtering means 8, pass through the pressure regulating valve 9, and are recovered in the recovery portion 10.

In the above-described method, a pressure is applied to liquid fed through the inside of the pipe. Therefore, it is preferable that a high-pressure metal pipe is used as the pipe. As metal constituting the pipe, stainless steel such as SUS316 or SUS304 a nickel alloy such as INCONEL (registered trade name) or HASTELLOY (registered trade name) is preferable due to its low corrosiveness. However, the metal is not limited to the above examples, and similar or equivalent materials thereof can also be used. In addition, a pipe having a laminate configuration described in JP2010-104928A may be used.

In the production device shown in FIG. 1, water in a subcritical to a supercritical state is mixed with the precursor particle solution in the mixing portion M1 in which the pipes are joined to each other through a T-shaped joint. However, for example, a reactor described in JP2007-268503A, JP2008-12453A, or JP2010-75914A may also be used. As a material of the reactor, a material described in JP2007-268503A, JP2008-12453A, or JP2010-75914A is preferable. Specifically, as the metal constituting the pipe, one of the above-described metals is preferable. However, the metal is not limited to the above examples, and similar or equivalent materials thereof can also be used. In addition, for example, low-corrosion titanium alloys, tantalum alloys, and ceramics may be combined with each other.

FIG. 2 is a schematic diagram showing another embodiment of a production device which is preferable for a continuous hydrothermal synthesis process. The production device shown in FIG. 2 is different from the production device shown in FIG. 1, in that: a liquid tank 3 is provided in addition to the liquid tanks 1 and 2; and pressurization-liquid feeding means 5c and a pipe 102 are provided for a liquid in the liquid tank 3. An additive solution is introduced into the liquid tank 3, is fed to the pipe 102, and is mixed with the precursor particle solution. Next, in the mixing portion M1, the mixed solution may be brought into contact with water in a subcritical to supercritical state. That is, in the production method for metal oxide particles according to the embodiment of the present invention, after an additive is added to the precursor particle solution, the conversion reaction can also be performed in which the mixed solution is brought into contact with water in a subcritical to a supercritical state to convert the precursor particles into metal oxide particles. As a preferable embodiment of the additive added herein is, for example, the above-described organic compound can be adopted. In order to obtain finer metal oxide particles having a uniform particle size, it is effective to add the organic compound. The organic compound can be mixed with the precursor particle solution, for example, in an amount of about 1 part by mass to 1000 parts by mass with respect to 100 parts by mass of the precursor particles.

Optionally, the metal oxide particles obtained as described above can be provided for the subsequent steps of washing, drying, and the like.

[Metal Oxide Powder]

Another embodiment of the present invention relates to a metal oxide powder containing metal oxide particles that is obtained using the above-described production method.

According to the above-described production method, fine metal oxide particles having high uniformity in particle size can be obtained using a hydrothermal synthesis process. For example, the metal oxide powder has an average sphere equivalent diameter of 5 nm to 30 nm and has an average particle size of 5 nm to 20 nm. In addition, regarding the uniformity of the particle size, a sharp particle size distribution in which the coefficient of variation in the sphere equivalent diameter is 5% to 40% can be exhibited. The above-described coefficient of variation may be 10% to 35% or may be 15% to 30%. The fine metal oxide powder having high uniformity in particle size is useful in various fields, for example, a magnetic recording field, a semiconductor field, and a catalyst field.

The average sphere equivalent diameter is a value obtained using a transmission electron microscope observation method. Specifically, a particle image is imaged with a direct method using an electron microscope (for example, a transmission electron microscope H-9000; manufactured by Hitachi Ltd.) at an acceleration voltage of 100 kV. In the particle image, sphere equivalent diameters are obtained from projected areas of 500 particles, and the average value of 500 particles is obtained as an average sphere equivalent diameter. More specifically, the particle image is imaged at an imaging magnification of 100000 times and is printed on printing paper at a total magnification of 500000. Target particles are selected from the particle image, contours of the particles are traced with a digitizer, and the sizes of the particles are measured using image analysis software KS-400 (manufactured by Carl Zeiss AG). In addition, the coefficient of variation in the sphere equivalent diameter is a value obtained by dividing a standard deviation of the sphere equivalent diameters of 500 particles by the average sphere equivalent diameter thereof. Regarding each of particles other than isotropic particles, for example, plate particles, the diameter and the thickness are obtained by transmission electron microscope observation from a side surface thereof, and an sphere equivalent diameter is obtained. Here, an isotropic particle refers to a particle in which a ratio of a major axis length to a minor axis length (major axis length/minor axis length) is 1 to 2 and preferably 1 to 1.5. For example, in a magnetic recording medium, in order to increase the filling rate of a magnetic body in a magnetic layer for higher density recording, it is preferable that the magnetic body is formed of isotropic particles.

For example, in a magnetic recording medium described below, high recording density can be realized with a fine-particle magnetic body having a particle size of 30 nm or less and preferably 20 nm or less. In addition, a magnetic body having a particle size of 5 nm or more is preferable from the viewpoint of magnetization stability. Accordingly, the metal oxide powder is preferable as a ferromagnetic powder in a magnetic layer of a magnetic recording medium. That is, as a preferable embodiment of the metal oxide powder, a magnetic powder for magnetic recording can be adopted. As a specific preferable embodiment of the magnetic powder, for example, a ferromagnetic hexagonal ferrite powder can be adopted. By providing the precursor particles formed of an iron salt and an alkali earth metal salt for the above-described steps, a ferromagnetic hexagonal ferrite powder formed of hexagonal ferrite particles can be obtained.

Regarding a metal oxide powder present as a powder, the above-described particle size can be obtained by observing the powder with a transmission electron microscope. On the other hand, regarding a metal oxide powder contained in a coating film such as a magnetic layer of a magnetic recording medium, a measurement sample can be obtained by extracting a powder from the coating film. For example, a magnetic layer is peeled off from a magnetic recording medium, 0.1 ml to 100 ml of n-butylamine is added to 100 mg to 500 mg of the magnetic layer. Next, the magnetic layer is sealed in a glass tube and is set in a pyrolyzer to be heated at 100° C. for 3 days. After being cooled, the content is extracted from the glass tube and is centrifuged to separate liquid and solid matter from each other. The separated solid matter is washed with acetone to obtain a powder sample. When heated at about 100° C. or dipped in an organic solvent, an oxide is not substantially damaged. Therefore, using the above-described method, the particle size of the powder contained in the magnetic layer can be measured.

[Magnetic Recording Medium]

Another embodiment of the present invention relates to a magnetic recording medium including a magnetic layer that contains a ferromagnetic powder and a binder on a nonmagnetic support, in which the ferromagnetic powder is the above-described metal oxide powder.

As described above, the above-described metal oxide powder is formed of fine particles having high uniformity in particle size. Therefore, by using the metal oxide powder as a ferromagnetic powder of a magnetic layer, a magnetic recording medium having superior electromagnetic conversion characteristics can be provided.

Hereinafter, the magnetic recording medium according to the embodiment of the present invention will be described in more detail.

Magnetic Layer

The metal oxide powder, which is the ferromagnetic powder used in the magnetic layer, and the production method therefor are as described above.

The magnetic layer contains a ferromagnetic powder and a binder. As the binder contained in the magnetic layer, a single resin or a mixture of two or more resins can be used, and examples of the resins include a polyurethane resin, a polyester resin, a polyamide resin, a vinyl chloride resin, an acrylic resin obtained by copolymerization of styrene, acrylonitrile, methyl methacrylate, and the like, a cellulose resin such as nitrocellulose, an epoxy resin, a phenoxy resin, and a polyvinyl alkyral resin such as polyvinyl acetal or polyvinyl butyral. Among these, a polyurethane resin, an acrylic resin, a cellulose resin, or a vinyl chloride resin is preferable. The resins can be used as a binder in a nonmagnetic layer described below. The above-described binder can refer to paragraphs "0029" to "0031" of JP2010-24113A. In addition, not only the resin but also a polyisocyanate curing agent can also be used.

Optionally, an additive can be added to the magnetic layer. Examples of the additive include an abrasive, a lubricant, a dispersant, a dispersing auxiliary agent, an antifungal agent, an antistatic agent, an antioxidant, a solvent, and carbon black. As the above-described additives, a commercially available product can be appropriately selected and used according to desired characteristics.

Nonmagnetic Layer

Next, the details of the nonmagnetic layer will be described. The magnetic recording medium according to the embodiment of the present invention may further include a nonmagnetic layer that is provided between the nonmagnetic support and the magnetic layer and contains a nonmagnetic powder and a binder. The nonmagnetic powder used in the nonmagnetic layer may be either an inorganic material or an organic material. In addition, for example, carbon black can also be used. Examples of the inorganic material include a metal, a metal oxide, a metal carbonate, a metal sulfate, a metal nitride, a metal carbide, and a metal sulfide. These nonmagnetic powders are available as a commercially available product and can be produced using a well-known method. The details can refer to paragraphs "0036" to "0039" of JP2010-24113A.

The binder, a lubricant, a dispersant, an additive, a solvent, a dispersing method and the like for the nonmagnetic layer can adopt the same configurations as those for the magnetic layer. In particular, regarding the amount and kind of the binder, the additive, and the addition amount and kind of the dispersant, well-known techniques relating to the magnetic layer can be applied. In addition, carbon black or an organic powder can be added to the nonmagnetic layer. The details can refer to, for example, paragraphs "0040" to "0042" of JP2010-24113A.

Nonmagnetic Support

Examples of the nonmagnetic support include a well-known biaxially oriented support such as polyethylene terephthalate, polyethylene naphthalate, polyamide, polyamide imide, or an aromatic polyamide. Among these, polyethylene terephthalate, polyethylene naphthalate, or polyamide is preferable.

These supports may undergo, for example, corona discharge, plasma treatment, adhesion-enhancing treatment, heat treatment or the like in advance. In addition, regarding the surface roughness of the nonmagnetic support which can be used in the present invention, the center line average roughness Ra thereof at a cut-off value of 0.25 mm is preferably 3 nm to 10 nm.

Layer Configuration

Regarding the thickness configuration of the magnetic recording medium according to the embodiment of the present invention, the thickness of the nonmagnetic support is preferably 3 µm to 80 µm. The thickness of the magnetic layer may be optimized depending on the amount of saturation magnetization of a magnetic head used, the head gap length, and the bandwidth of a recording signal, but is generally 0.01 µm to 0.15 µm, preferably 0.02 µm to 0.12 µm, and more preferably 0.03 µm to 0.10 µm. The magnetic layer only has to include at least one layer. The magnetic layer may be separated into two or more layers having different magnetic characteristics, and a configuration relating to a well-known multi-layer magnetic layer can be adopted.

The thickness of the nonmagnetic layer is, for example, 0.1 µm to 3.0 µm, preferably 0.3 µm to 2.0 µm, and more preferably 0.5 µm to 1.5 µm. The nonmagnetic layer of the magnetic recording medium according to the embodiment of the present invention exhibits the effects as long as it is substantially nonmagnetic. For example, even when a small amount of magnetic body is added as an impurity or on purpose, the effects of the present invention are exhibited, and it can be considered that substantially the same configuration as that of the magnetic recording medium according to the embodiment of the present invention is adopted. Substantially the same configuration represents that the nonmagnetic layer has a residual magnetic flux density of 10 mT or lower or a coercive force of 7.96 kA/m (100 Oe) or lower and, preferably, has neither residual magnetic flux density nor coercive force.

Backcoat Layer

In the magnetic recording medium, a backcoat layer may be provided on a surface of the nonmagnetic support opposite to a surface on which the magnetic layer is provided. It is preferable that the backcoat layer contains carbon black and inorganic powder. Regarding a binder and various additives for forming the backcoat layer, the same formulae as those in the magnetic layer or the nonmagnetic layer can be adopted. The thickness of the backcoat layer is preferably 0.9 µm or less and more preferably 0.1 µm to 0.7 µm.

Production Method

A step of preparing a coating solution for forming the magnetic layer, the nonmagnetic layer or the backcoat layer typically includes at least a kneading step and a dispersing step and optionally further includes a mixing step that is provided before and after the above steps. Each of the respective steps may be divided into two or more steps. All the materials used in the present invention such as a ferromagnetic powder, a nonmagnetic powder, a binder, carbon black, an abrasive, an antistatic agent, a lubricant, or a solvent may be added in the beginning or middle of any of the above steps. In addition, each of the materials may be dividedly added through two or more steps. For example, polyurethane may be dividedly added through the kneading step, the dispersing step, and the mixing step for adjusting the viscosity after dispersing. In order to achieve the object of the present invention, a well-known production technique of the related art can be used in a part of the steps. In the kneading step, it is preferable that an apparatus having a strong kneading force such as an open kneader, a continuous kneader, a pressurizing kneader, or an extruder is used. The details of the above kneading treatment are described in JP1989-106338 (JP-H01-106338) and JP1989-79274 (JP-H01-79274). In addition, in order to disperse a magnetic layer coating solution, a nonmagnetic layer coating solution, or a backcoat layer coating solution, glass beads can be used. As the glass beads, zirconia beads, titania beads, or steel beads which are a dispersing medium having high specific gravity are preferable. The particle size and filling rate of these dispersing media are optimized for use. As a disperser, a well-known disperser can be used. The details of a method of manufacturing the magnetic recording medium can refer to, for example, paragraphs "0051" to "0057" of JP2010-24113A.

The above-described magnetic recording medium according to the embodiment of the present invention contains the above-described metal oxide powder in the magnetic layer and thus can exhibit high electromagnetic conversion characteristics in a high-density recording region. Therefore, the magnetic recording medium is preferable as a high-capacity magnetic recording medium such as a backup tape.

EXAMPLES

Hereinafter, the present invention will be described in more detail using Examples. However, the present invention is not limited to embodiments shown in Examples. In the following description, "part(s)" represents "part(s) by mass". In addition, unless specified otherwise, steps and evaluations described below were performed in the air at 23° C.±1° C.

In the following X-ray diffraction (XRD) analysis, CuKα rays were scanned under conditions of 45 kV and 40 mA, and an XRD pattern was measured.

The average particle size of hydroxide particles contained in precursor particles (hydroxide sol) described below, the coefficient of variation in the particle size, the average sphere equivalent diameter of hexagonal ferrite, and the coefficient of variation in the sphere equivalent diameter were obtained with the above-described method by using a transmission electron microscope H-9000 (manufactured by Hitachi Ltd.) as an electron microscope.

In addition, the pH of a reaction solution during a synthesis reaction of the precursor particles refers to a value obtained by extracting a part of the solution and measuring the pH at a liquid temperature of 25° C.

1. Examples and Comparative Examples Relating to Metal Oxide Particles (Hexagonal Ferrite Particles)

Example 1-1

(1) Preparation of Precursor Particle Solution

Sodium oleate ($C_{17}H_{33}COONa$) was dissolved in purified water, and barium hydroxide ($Ba(OH)_2.8H_2O$), iron nitrate (III) ($Fe(NO_3)_3.9H_2O$), and KOH were dissolved therein. As a result, a hydroxide sol used as a precursor particle solution was prepared. The concentration of the prepared aqueous solution (sol) (total concentration of Ba and Fe) was 0.01 M, and a molar ratio Ba/Fe was 0.5. The concentration of sodium oleate was 0.1 M. KOH was added in an amount adjusted such that the pH in the reaction solution was 8.

(2) Synthesis of Hexagonal Ferrite Particles Using Continuous Hydrothermal Synthesis Process The aqueous solution (sol) prepared in (1) described below was introduced into the liquid tank 2 of the production device shown in FIG. 1. As the pipe of the production device, a SUS 316 BA tube was used.

The purified water introduced into the liquid tank 1 was heated by a heater 4 while being fed by a high-pressure pump 5a. As a result, high-temperature and high-pressure water was made to flow through the pipe 100. At this time, the temperature and the pressure were adjusted such that the temperature and the pressure of the high-temperature and high-pressure water after having passed through the heating means 4c were 450° C. and 30 MPa, respectively.

On the other hand, the aqueous solution (sol) was fed to the pipe 101 at 25° C. using a high-pressure pump 5b and was mixed with the high-temperature and high-pressure water in the mixing portion M1. Next, in the reactor 6, the mixed solution was heated to 400° C. and was pressurized at 30 MPa. As a result, barium ferrite nanoparticles were synthesized.

After the synthesis of the barium ferrite nanoparticles, a solution containing the barium ferrite nanoparticles was cooled by cold water in the cooling portion 7 and then was collected.

The collected particles were washed with ethanol and then centrifuged. As a result, barium ferrite nanoparticles were separated.

Comparative Example 1-1

The same process as in Example 1-1 was performed, except that sodium oleate was not used in (1) described above.

Examples 1-2 to 1-11

The same process as in Example 1-1 was performed, except that: the concentration of sodium oleate in (1) described above was changed to a concentration shown in Table 1; and the synthesis reaction of the precursor particles was performed such that the pH of the reaction solution was a value shown in Table 1.

Example 1-12

Strontium ferrite nanoparticles were obtained using the same method as in Example 1-1, except that: strontium hydroxide $(Sr(OH)_2 \cdot 8H_2O)$ was used instead of barium hydroxide $(Ba(OH)_2 \cdot 8H_2O)$.

Examples 1-13 to 1-15

The same process as in Example 1-1 was performed, except that an organic compound having a kind and a concentration shown in Table 1 was used instead of sodium oleate.

Comparative Example 1-2

The same process as in Example 1-1 was performed, except that: sodium oleate was not used in (1) described above; and a sodium oleate-containing aqueous solution (oleic acid concentration: 0.1 M) was introduced from the pipe 102 of the production device shown in FIG. 2 and was mixed with the precursor solution at a volume ratio (precursor solution:sodium oleate-containing aqueous solution) of 1:1.

When analyzed by X-ray diffraction analysis, it was verified that the particles obtained each of Examples and Comparative Examples were formed of hexagonal ferrite. The average particle size of the precursor particles, the coefficient of variation in the particle size, the average sphere equivalent diameter of the obtained hexagonal ferrite nanoparticles, and the coefficient of variation in the sphere equivalent diameter are shown in Table 1 below.

TABLE 1

| | Alkali Earth Metal Salt | pH During Synthesis Reaction of Precursor Particles | Kind of Organic Compound, Concentration | Precursor Particles | | Hexagonal Ferrite | |
|---|---|---|---|---|---|---|---|
| | | | | Average Particle Size | Coefficient of Variation | Average Particle Size | Coefficient of Variation |
| Example 1-1 | $Ba(OH)_2 \cdot 8H_2O$ | 8 | Sodium Oleate, 0.1M | 8.0 nm | 18% | 9.3 nm | 19% |
| Example 1-2 | $Ba(OH)_2 \cdot 8H_2O$ | 10 | Sodium Oleate, 0.1M | 13.0 nm | 19% | 14.3 nm | 21% |
| Example 1-3 | $Ba(OH)_2 \cdot 8H_2O$ | 12 | Sodium Oleate, 0.1M | 16.2 nm | 21% | 18.0 nm | 20% |
| Example 1-4 | $Ba(OH)_2 \cdot 8H_2O$ | 14 | Sodium Oleate, 0.1M | 19.2 nm | 28% | 19.8 nm | 25% |
| Example 1-5 | $Ba(OH)_2 \cdot 8H_2O$ | 6 | Sodium Oleate, 0.1M | 10.0 nm | 22% | 10.8 nm | 25% |
| Example 1-6 | $Ba(OH)_2 \cdot 8H_2O$ | 5 | Sodium Oleate, 0.1M | 13.1 nm | 23% | 14.5 nm | 26% |
| Example 1-7 | $Ba(OH)_2 \cdot 8H_2O$ | 4 | Sodium Oleate, 0.1M | 23.5 nm | 35% | 26.0 nm | 35% |
| Example 1-8 | $Ba(OH)_2 \cdot 8H_2O$ | 8 | Sodium Oleate, 0.05M | 9.8 nm | 20% | 11.2 nm | 23% |
| Example 1-9 | $Ba(OH)_2 \cdot 8H_2O$ | 8 | Sodium Oleate, 1M | 6.8 nm | 20% | 7.5 nm | 24% |
| Example 1-10 | $Ba(OH)_2 \cdot 8H_2O$ | 8 | Sodium Oleate, 5M | 5.6 nm | 23% | 6.0 nm | 25% |
| Example 1-11 | $Ba(OH)_2 \cdot 8H_2O$ | 8 | Sodium Oleate, 10M | 5.3 nm | 24% | 5.5 nm | 23% |
| Example 1-12 | $Sr(OH)_2 \cdot 8H_2O$ | 8 | Sodium Oleate, 0.1M | 6.9 nm | 23% | 7.3 nm | 20% |
| Comparative Example 1-1 | $Ba(OH)_2 \cdot 8H_2O$ | 8 | None | 28.9 nm | 42% | 48.0 nm | 45% |
| Comparative Example 1-2 | $Ba(OH)_2 \cdot 8H_2O$ | 8 | None | 28.9 nm | 39% | 40.2 nm | 43% |
| Example 1-13 | $Ba(OH)_2 \cdot 8H_2O$ | 8 | Polyvinyl Pyrrolidone (Mass Average Molecular Weight: 10000), 0.1 mass % | 12.0 nm | 27% | 13.4 nm | 30% |

TABLE 1-continued

|  | Alkali Earth Metal Salt | pH During Synthesis Reaction of Precursor Particles | Kind of Organic Compound, Concentration | Precursor Particles | | Hexagonal Ferrite | |
|---|---|---|---|---|---|---|---|
|  |  |  |  | Average Particle Size | Coefficient of Variation | Average Particle Size | Coefficient of Variation |
| Example 1-14 | Ba(OH)$_2$·8H$_2$O | 8 | Polyvinyl Alcohol (Mass Average Molecular Weight: 15000), 0.1 mass % | 11.0 nm | 29% | 12 nm | 34% |
| Example 1-15 | Ba(OH)$_2$·8H$_2$O | 8 | Sodium Bis(2-Ethylhexyl) Sulfosuccinate, 0.05 mass % | 5.0 nm | 15% | 10.3 nm | 20% |

It can be seen from a comparison between Examples and Comparative Examples that, with the production method according to the embodiment of the present invention, fine metal oxide particles having a uniform particle size can be obtained.

2. Examples and Comparative Examples Relating to Magnetic Recording Medium (Magnetic Tape)

Examples 2-1 to 2-15 and Comparative Examples 2-1 and 2-2

(1) Formula of Magnetic Layer Coating Solution
(Magnetic Solution)
Ferromagnetic hexagonal ferrite powder (shown in Table 2): 100 parts
SO$_3$Na group-containing polyurethane resin: 14 parts
 (mass average molecular weight: 70,000, SO$_3$Na group: 0.4 meq/g)
Cyclohexanone: 150 parts
Methyl ethyl ketone: 150 parts
(Abrasive Solution)
Abrasive solution A, alumina abrasive (average particle size: 100 nm): 3 parts
Sulfonic acid group-containing polyurethane resin: 0.3 parts
 (mass average molecular weight: 70,000, SO$_3$Na group: 0.3 meq/g)
Cyclohexanone: 26.7 parts
Abrasive solution B diamond abrasive (average particle size: 100 nm): 1 part
Sulfonic acid group-containing polyurethane resin: 0.1 parts
 (mass average molecular weight: 70,000, SO$_3$Na group: 0.3 meq/g)
Cyclohexanone: 26.7 parts
(Silica Sol)
Colloidal silica (average particle size: 100 nm): 0.2 parts
Methyl ethyl ketone: 1.4 parts
(Other Components)
Stearic acid: 2 parts
Butyl stearate: 6 parts
Polyisocyanate (CORONATE, manufactured by Nippon Polyurethane Industry Co., Ltd.): 2.5 parts
(Solvent for Finishing)
Cyclohexanone: 200 parts methyl ethyl ketone: 200 parts
(2) Formula of Nonmagnetic Layer Coating Solution
Nonmagnetic inorganic powder, α-iron oxide: 100 parts
 Average major axis length: 10 nm
 Average acicular ratio: 1.9
 BET specific surface area: 75 m$^2$/g
Carbon black: 25 parts
 Average particle size 20 nm
SO$_3$Na group-containing polyurethane resin: 18 parts
 (mass average molecular weight: 70,000, SO$_3$Na group: 0.2 meq/g)
Stearic acid: 1 part
Cyclohexanone: 300 parts
Methyl ethyl ketone: 300 parts
(3) Formula of Backcoat Layer Coating Solution
Nonmagnetic inorganic powder, α-iron oxide: 80 parts
 Average major axis length: 0.15 μm
 Average acicular ratio: 7
 BET specific surface area: 52 m$^2$/g
Carbon black: 20 parts
 Average particle size 20 nm
Vinylidene chloride copolymer: 13 parts
Sulfonic acid group-containing polyurethane resin: 6 parts
Phenylphosphonic acid: 3 parts
Cyclohexanone: 155 parts
Methyl ethyl ketone: 155 parts
Stearic acid: 3 parts
Butyl stearate: 3 parts
Polyisocyanate: 5 parts
Cyclohexanone: 200 parts
(3) Preparation of Magnetic Tape The magnetic solution was dispersed using a batch type vertical sand mill for 24 hours. As a dispersing medium, 0.5 mmϕ zirconia beads were used. The abrasive solution was dispersed using a batch type ultrasonic device (20 kHz, 300 W) for 24 hours. These dispersions were mixed with the other components (silica sol, other components, and the solvent for finishing), and the obtained mixture was treated using a batch type ultrasonic device (20 kHz, 300 W) for 30 minutes. Next, the mixture was filtered through a filter having an average pore size of 0.5 μm to prepare a magnetic layer coating solution.

Regarding the nonmagnetic layer coating solution, the respective components were dispersed using a batch type vertical sand mill for 24 hours. As a dispersing medium, 0.1 mmϕ zirconia beads were used. Next, the obtained dispersion was filtered through a filter having an average pore size of 0.5 μm to prepare a nonmagnetic layer coating solution.

Regarding the backcoat layer coating solution, all the components excluding lubricants (stearic acid and butyl stearate), polyisocyanate, and 200 parts of cyclohexanone were kneaded and diluted in an open kneader. Next, the kneaded material was dispersed using a horizontal bead mill with 1 mmϕ zirconia beads under conditions of bead filling rate: 80%, rotor tip speed: 10 m/sec, retention time per 1 pass: 2 min, and number of passes: 12. Next, the remaining components were added to the dispersion and was stirred with a dissolver. The obtained dispersion was filtered through a filter having an average pore size of 1 μm to prepare a backcoat layer coating solution.

Next, the nonmagnetic layer coating solution was applied to a support formed of polyethylene naphthalate having a thickness of 5 μm (center line surface roughness (Ra value) when measured using an optical 3D roughness meter and 20-fold objective lens: 1.5 nm, Young's modulus in the width direction: 8 GPa, Young's modulus in the longitudinal direction: 6 GPa) such that the thickness thereof after drying was 100 nm, and was dried. Next, the magnetic layer coating solution was applied to the nonmagnetic layer such that the thickness thereof after drying was 70 nm. Before the magnetic layer coating solution was dried, a magnetic field having a magnetic field strength of 0.6 T was applied to in a direction perpendicular to the coated surface for vertical orientation, and then the magnetic layer coating solution was dried. Next, the backcoat layer coating solution was applied to an opposite surface of the support such that the thickness after drying was 0.4 and then was dried.

Next, using a calender consisting of only metal rolls, surface smoothing was performed under conditions of speed: 100 m/min, linear pressure: 300 kg/cm, and temperature: 100° C., and a heat treatment was performed in a dry environment at 70° C. for 36 hours. After the heat treatment, the product was slit to a ½ inch width to obtain a magnetic tape.

(4) Evaluation of Electromagnetic Conversion Characteristics (SNR)

Regarding each of the magnetic tapes, a ratio of a reproduction signal to noise (SNR) was obtained by attaching a recording head (MIG, gap: 0.15 µm, 1.8 T) and a reproduction GMR head to a drum tester and recording and reproducing a signal having a track density of 16 KTPI and a linear recording density of 400 Kbpi (surface recording density: 6.4 Gbpsi) The results are shown in Table 2 below.

TABLE 2

| | Evaluation Result of Medium | |
|---|---|---|
| | Ferromagnetic Powder | SNR |
| Example 2-1 | Example 1-1 | +2.1 dB |
| Example 2-2 | Example 1-2 | +1.6 dB |
| Example 2-3 | Example 1-3 | +1.3 dB |
| Example 2-4 | Example 1-4 | +1.2 dB |
| Example 2-5 | Example 1-5 | +2.0 dB |
| Example 2-6 | Example 1-6 | +1.6 dB |
| Example 2-7 | Example 1-7 | +0.8 dB |
| Example 2-8 | Example 1-8 | +1.9 dB |
| Example 2-9 | Example 1-9 | +2.4 dB |
| Example 2-10 | Example 1-10 | +2.7 dB |
| Example 2-11 | Example 1-11 | +2.8 dB |
| Example 2-12 | Example 1-12 | +2.5 dB |
| Comparative Example 2-1 | Comparative Example 1-1 | ±0.0 dB |
| Comparative Example 2-2 | Comparative Example 1-2 | +0.2 dB |
| Example 2-13 | Example 1-13 | +1.7 dB |
| Example 2-14 | Example 1-14 | +1.8 dB |
| Example 2-15 | Example 1-15 | +2.0 dB |

Evaluation Results

It can be seen from the results shown in Table 2 that, when a fine ferromagnetic hexagonal ferrite powder obtained using the production method according to the embodiment of the present invention is used as a ferromagnetic powder of a magnetic layer, a magnetic recording medium having superior electromagnetic conversion characteristics (high SNR) can be obtained.

The present invention is useful in a field of manufacturing a high-capacity magnetic recording medium such as a backup tape.

What is claimed is:

1. A production method for metal oxide particles comprising:
   synthesizing precursor particles of a metal oxide by a synthesis reaction in which the precursor particles are formed in the presence of an organic compound during the synthesis reaction; and
   converting the precursor particles into metal oxide particles by heating an aqueous solution containing said precursor particles to 300° C. or higher and pressurizing the aqueous solution at a pressure of 20 MPa or higher,
   wherein the synthesis reaction is performed in an aqueous reaction solution in a pH range of 5 to 14.

2. The production method for metal oxide particles according to claim 1,
   wherein the heating and pressurizing is performed while continuously feeding the aqueous solution.

3. The production method for metal oxide particles according to claim 1,
   wherein an average particle size of the precursor particles is 25 nm or less.

4. The production method for metal oxide particles according to claim 2,
   wherein an average particle size of the precursor particles is 25 nm or less.

5. The production method for metal oxide particles according to claim 1,
   wherein a coefficient of variation in the particle size of the precursor particles is 5% to 40%.

6. The production method for metal oxide particles according to claim 1,
   wherein, in the synthesis reaction, an iron salt, an alkali earth metal salt, and the organic compound are mixed with each other in an aqueous solution so as to cause precursor particles of hexagonal ferrite to precipitate.

7. The production method for metal oxide particles according to claim 1,
   wherein the conversion of the precursor particles into metal oxide particles is performed through the following steps including:
   adding a precursor particle solution containing the precursor particles, which are obtained in the synthesis reaction, to a liquid feeding path to which water, which is heated to 300° C. or higher and is pressurized at a pressure of 20 MPa or higher, is continuously fed; and
   converting the precursor particles into metal oxide particles by continuously feeding a mixed solution containing water and the precursor particle solution to the liquid feeding path while heating the mixed solution to 300° C. or higher and pressurizing the mixed solution at a pressure of 20 MPa or higher.

8. The production method for metal oxide particles according to claim 1,
   wherein the metal oxide particles are hexagonal ferrite particles selected from the group consisting of barium ferrite, strontium ferrite, and a mixed crystal of barium ferrite and strontium ferrite.

9. The production method for metal oxide particles according to claim 1,
   wherein the organic compound is selected from the group consisting of a carboxylic acid, a carboxylate, an anionic surfactant, and a water-soluble polymer.

10. The production method for metal oxide particles according to claim 1,
    wherein the precursor particles of a metal oxide are obtained by performing a reaction of two or more starting material compounds in the presence of an organic compound, the reaction being one in which the organic compound is added to a reaction solvent to dissolve or suspend the organic compound therein, and then the two or more starting material compounds are added to the reaction solvent, to perform the reaction.

\* \* \* \* \*